(No Model.) 2 Sheets—Sheet 1.

P. P. SHERRY.
SHANK CREASING AND COLORING MACHINE FOR BOOTS OR SHOES.

No. 355,566. Patented Jan. 4, 1887.

WITNESSES
John A. Rennie
Horace Brown

INVENTOR
Patrick P. Sherry
by Wright, Brown & Crosley
Attys.

(No Model.) 2 Sheets—Sheet 2.
P. P. SHERRY.
SHANK CREASING AND COLORING MACHINE FOR BOOTS OR SHOES.
No. 355,566. Patented Jan. 4, 1887.

WITNESSES:
John A. Rennie
Horace Brown

INVENTOR:
Patrick P. Sherry.
by Wright, Brown & Croseley,
attys.

UNITED STATES PATENT OFFICE.

PATRICK P. SHERRY, OF LYNN, MASSACHUSETTS.

SHANK CREASING AND COLORING MACHINE FOR BOOTS OR SHOES.

SPECIFICATION forming part of Letters Patent No. 355,566, dated January 4, 1887.

Application filed April 20, 1886. Serial No. 199,464. (No model.)

*To all whom it may concern:*

Be it known that I, PATRICK P. SHERRY, of Lynn, in the county of Essex, and State of Massachusetts, have invented certain new and useful Improvements in Shank Creasing and Coloring Machines for Boots or Shoes, of which the following is a specification.

My invention relates to devices for cutting or creasing and coloring the shanks of boot or shoe soles, and has for its object to provide a contrivance of the character mentioned in which the knives may be adjusted to suit any desired outline, and in which the edges of the knives may be made to automatically conform to any curvature of the bottom of the sole, and thus bear evenly thereon, thus increasing the efficiency of such machines, and at the same time rendering them comparatively simple in construction and operation.

To the foregoing ends my invention consists in forming the knives in the machines mentioned in sections in such manner that the cutting or creasing edges of the several sections shall be, when the parts are assembled, continuous and unbroken; also, in making the sections comprising each of said knives adjustable upon each other, so that the cutting or creasing edge of the several parts may be extended or shortened, as desired; also, in making said knives adjustable on their support, so that the curvature of the cutting or creasing edge may be varied to suit any desired outline; also, in hinging or pivoting the sections of the knives together in such manner that the cutting or creasing edges may be made to bear evenly on the surface of the sole; also, in making portions of said sectional knives interchangeable, in order to suit any design or pattern; and, also, in improvements incidental upon perfecting the foregoing, all as hereinafter described, and subsequently set forth in the claims.

Figure 1:
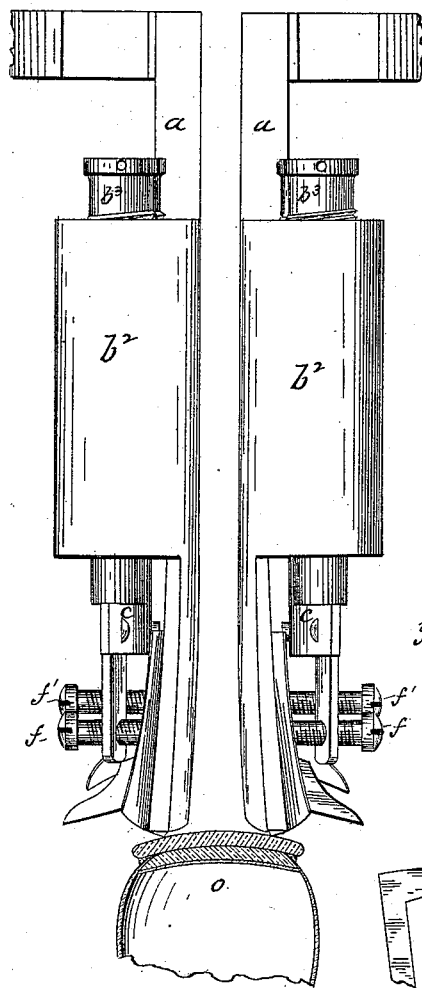
Figure 2:
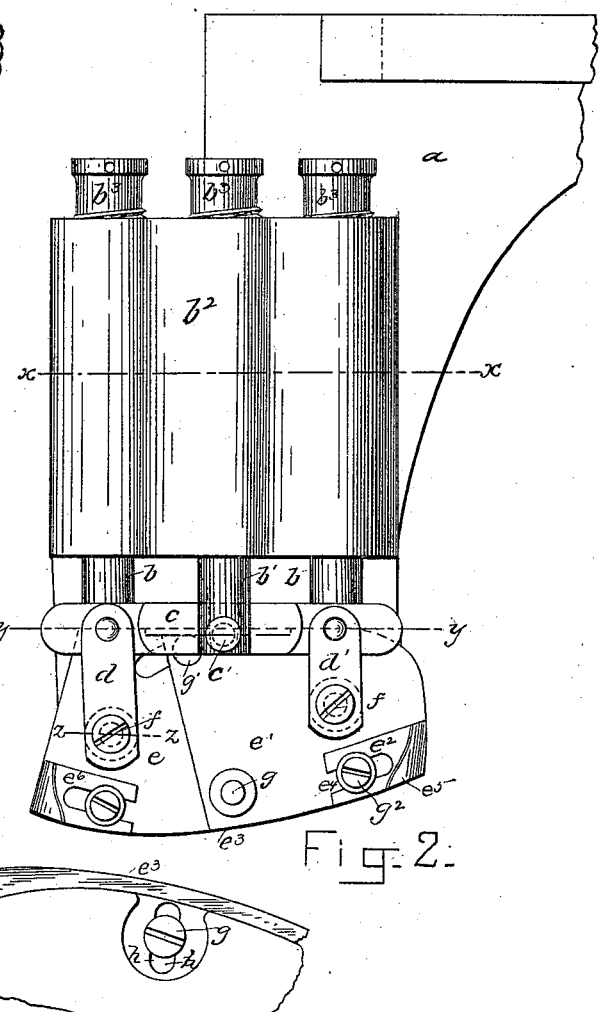
Figure 3:
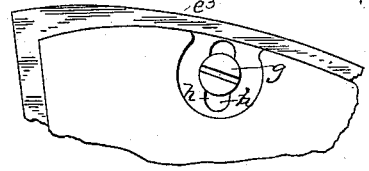
Figure 4:
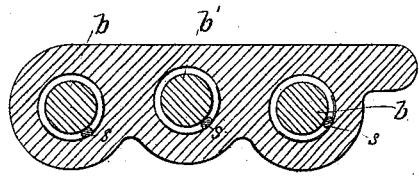
Figure 5:
Figure 6:
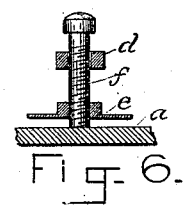
Figure 7:
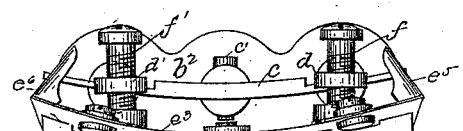
Figure 9:
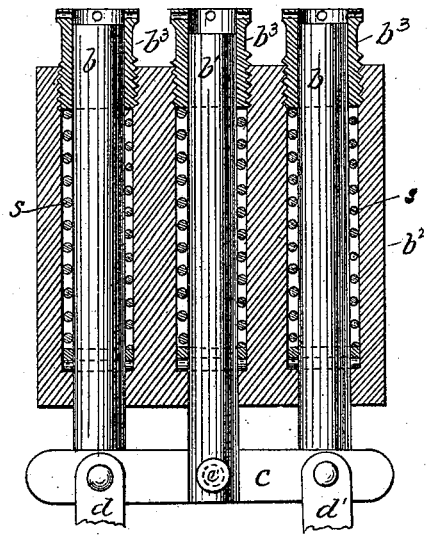
Figure 8:
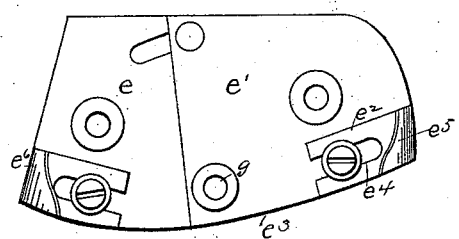
Figure 11:
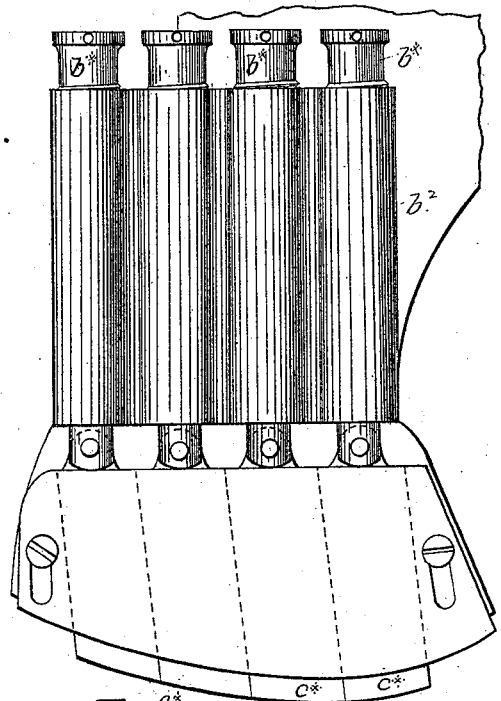
Figure 10:
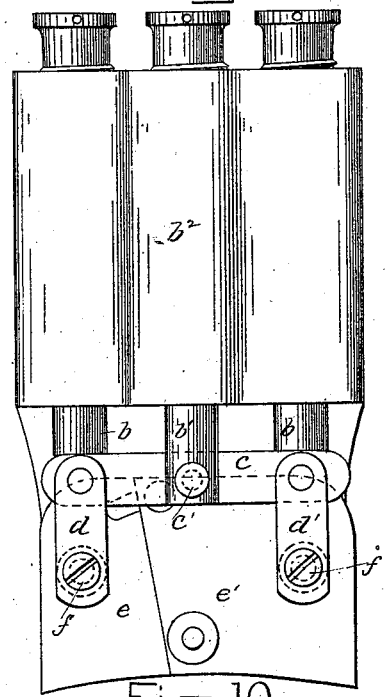

Of the drawings hereto annexed and forming a part of this specification, Figure 1 represents a front view of so much of a shank creasing and coloring machine as it is necessary to show embodying my invention, the part of the machine represented being equipped with a pair of creasing-knives for the sides of the shank. Fig. 2 represents a side view of the same. Fig. 3 represents a rear view inverted of a portion of one of the pair of knife-supports with the knives or creasers in position thereon. Fig. 4 represents a horizontal section on the line $x\,x$ of Fig. 2. Fig. 5 represents a section on the line $y\,y$, Fig. 2. Fig. 6 represents a section on the line $z\,z$, Fig. 2. Fig. 7 represents a bottom plan view of the parts shown in Fig. 2. Fig. 8 represents a side view of a set of sectional cutting or creasing knives. Fig. 9 represents a vertical sectional view through a portion of the frame, showing the manner in which the vertical rods are connected therewith and supported therein. Fig. 10 represents a front view of my invention, showing the manner of constructing and operating it in creasing the shank of a boot or shoe crosswise of the same, as when it is desired to color the entire sole-surface of the shank. Fig. 11 represents a modified form of constructing, arranging, and supporting the sectional knives.

Similar letters of reference indicate corresponding parts in all of the figures.

My invention is applicable to the type of machines shown and described in Letters Patent of the United States No. 243,599, dated June 28, 1881, and for convenience reference may be had to said patent, though it is evident that any machine of a similar character adapted to be equipped with creasing-knives and having a last or shoe support may be employed.

In the drawings, $a$ represents the frame or support for the knives or creasers, two such supports being employed when it is desired to color the sides of the sole-surface of the shank of the boot or shoe, as represented in Fig. 1.

In the description hereinafter given reference will be made, for the most part, to a single frame or support and its equipments.

$b$ and $b'$ represent vertical rods loosely sustained in an enlarged part, $b^2$, of the support $a$. Pivoted to the lower end of rod $b'$, at $c'$, is a slightly-curved bar, $c$, the construction and arrangement being such that said bar $c$ may be rocked on its pivot $c'$. The lower ends of rods $b\,b$ rest upon the bar $c$ at or near its ends, and are pressed downward thereon by means of a spiral spring, $s$, surrounding each of said rods in its bearing and attached at its lower end to said rod and resting or bearing at the upper end against a collar, $b^3$, screwed into the frame, all as clearly represented in Fig. 5.

Rod $b'$ is sustained in the frame $a$ in a manner similar to rods $b$, so as to yield slightly in the direction of its length when occasion may require.

Pivoted at one of their ends to the ends of the curved bar $c$ are links $d\ d'$. Said links are pivotally connected at their opposite ends to the creasing-knives $e\ e'$ by screws $f\ f'$, said screws passing through holes formed in the lower ends of links $d\ d'$ into and through screw-threaded holes formed in the creasing-knives $e\ e'$, and bearing against the side of the support or frame $a$. (See Figs. 1, 6, and 7.) The creasing-knives are preferably made in three sections, $e\ e'\ e^2$, sections $e$ and $e'$ being pivoted together near their lower edges by means of a screw, $g$, passing through a hole formed in one part into and through a screw-threaded hole formed in the other. A stud, $g'$, is secured to one part—in the present instance the part marked $e'$—whereby a limited movement of the two parts $e$ and $e'$ upon the pivot $g$ is provided for, so that the creasing-edge may conform to varying curvatures of shoe-shanks, to form a tight dam against the spread of the coloring-matter to parts it is desired not to reach. Section or part $e^2$ is secured to section $e'$ by means of a screw,$g^2$, passing therethrough into and through a screw-threaded hole formed in part $e'$. The construction and arrangement of the parts $e\ e'\ e^2$ is such that their lower edges will form one continuous and unbroken knife or creasing edge, $e^3$, and by means of an elongated slot, $e^4$, formed in a section, $e^2$, through which the connecting-screw $g^2$ passes, said part $e^2$ may be adjusted upon the part $e'$ in such manner as to extend or lengthen or shorten the knife or creasing edge $e^3$, as may be desired, in a manner that will be readily understood by those skilled in the art.

Section $e^2$ of the creasing-knives is bent at its outer end, $e^5$, as shown in Figs. 2, 7, and 8, forming a "return" portion of the knife-edge, for the purpose hereinafter stated. Said part $e^2$, in addition to being adjustable upon the part $e'$, is adapted to be readily removed therefrom and replaced by another having a different bend or different form of return part, or bent at a different angle to suit the different designs of coloring which it may be desired to give to the sides of the shank. An elongated slot, $h$, formed in the lower portion of the frame (see Fig. 3) permits of the vertical adjustment of the knives through the medium of screw $g$.

When the parts described are in their normal position, rods, $b\ b$ will bear at their lower ends on the ends of the curved rod $c$ in such manner as to turn the sections of the knives $e\ e'$ on their pivot $g$ and cause their lower edge, $e^3$, to assume a line horizontally straight, or nearly so, so that when said edge is pressed against the surface of the sole of the shank of the boot or shoe $o$ (shown in section in Fig. 1) the ends of the cutting or creasing edge of the knife will first strike the sole, and by a continuation of the pressure-rods $b\ b$ will yield, and with them the ends of the knives, so as to permit the center portion of the edge $e^3$ to bear with equal force on the sole, forming a close line along the entire length of the knife, whatever the form or curvature of the sole may be, so as to permit the coloring to be done alongside of the knives and prevent the coloring-matter from spreading beyond the knives, as will be understood by reference to the patent aforesaid.

When the pressure on the knives is released, rods $b\ b$, bearing upon the ends of the knives, will cause them to assume their former position.

In order to adapt the curve of the knives, when viewed in cross-section, to boots or shoes having different designs or shapes of shank, I provide for adjustment in this respect; and this I accomplish by means of the screws $f\ f$, which, as has been stated, pass through screw-threaded holes in the sections $e\ e'$ of the knives, so that by turning said screws inward they will operate to draw the ends of the knife outward, it being held at the center against lateral movement by means of the pivot-screw $g$.

As shown, section $e^2$ is not only adjustable on section $e'$, so as to extend or shorten the length of the knife-edge $e^3$, but it is made removable, so that it may be exchanged for another section in which the end is bent at a different angle with respect to the body portion, so as to form a different design of finish at the ends of the colored strips extending toward the toe of the shoe.

I find it desirable in most instances to attach a section, $e^6$, to the cutting-knives at the end thereof opposite to that at which section $e^2$ is secured thereto, said section $e^6$ having an angular portion formed integral therewith, adapted to rest against the breast of the heel, so as to prevent the latter from being colored by the coloring-pads or brushes or similar devices of the machine. By the construction shown it is not possible for the breast of the heel to receive any of the coloring-matter by reason of the fact that the return part of the section $e^6$ is integral with said section. As is shown, section $e^6$ is made adjustable on the part to which it is attached in order to vary the length of the creasing-edge.

In Fig. 11 I have shown the cutting or creasing knives as formed in sections, with a rod, $b^*$, for depressing each section, $c^*$. While in some instances it may be found desirable to employ this construction, in ordinary cases I prefer the other forms.

The center of the knife may be adjusted up or down on the support or frame $a$ by means of the set-screw $g$ passing through the elongated slot $h$, formed in the rear lower portion of the frame. (See Fig. 3.)

When it is desired to cover the entire surface of sole at the shank, the creasing-knives are attached to the frame or support $a$, so as to extend crosswise of the sole, as represented in Fig. 9, the frame or support being made at the same time to accommodate a creasing-knife of this form.

If it is desired to increase or diminish the force with which the rods $b\ b$ bear upon the ends of the creasing-knife, this can be accomplished by adjusting the collars $b^3$ up or down in the support or frame $b^2$, their screw-threaded connection with the frame permitting of this being done.

Having thus described my invention, I claim—

1. A cutting or creasing knife constructed in sections, with a substantially continuous and unbroken creasing-edge, and having pivots whereby said sections are yieldingly connected to each other to render the creasing-edge adjustable to shanks of different form or curvature, as set forth.

2. A cutting or creasing knife constructed in sections, with a substantially continuous and unbroken creasing-edge, certain of said sections having pivots, whereby they are yieldingly connected to each other, and mechanism, substantially as described, to adjust certain of said sections on other sections, to extend or shorten the length of the creasing-edge, as set forth.

3. A cutting or creasing knife constructed in sections, with a substantially continuous and unbroken creasing-edge, certain of said sections having pivots, whereby they are yieldingly connected to each other, and mechanism, substantially as described, for removably connecting certain sections with other sections, whereby said removable sections may be made interchangeable with other sections of different pattern or design, as set forth.

4. A cutting or creasing knife constructed in sections, with a substantially continuous and unbroken creasing-edge, and having pivots, whereby said sections are yieldingly connected to each other, in combination with the support for said knife, and mechanism, substantially as described, for adjusting it vertically on its support, as set forth.

5. A cutting or creasing knife constructed in sections, with a substantially unbroken and continuous creasing-edge, and having pivots, whereby said sections are yieldingly connected to each other, in combination with yielding mechanism consisting of spring-pressed rods, substantially as described, for pressing the knife upon the material or thing to be operated upon, as set forth.

6. The combination of the support, the creasing-knife secured to the support at a point between its ends, and adjusting-screws $f\ f'$, for adjusting the ends of the knife relatively to the support to vary the curvature of the creasing-edge of the knife, as set forth.

7. The combination, with the support, of the creasing-knife pivotally connected to said support, said knife being constructed in sections, with a substantially continuous and unbroken creasing-edge, and mechanism, substantially as described, for pressing said knife on the sole of the shoe, whereby the creasing-edge is made to conform to variations in the form or curvature of soles, as set forth.

8. A cutting or creasing knife constructed in sections, one of said sections being provided with a bent or return portion, $e^5$, to protect the surface of the forward part of the sole from coloring-matter, and mechanism, substantially as described, for removably connecting said section, provided with a return portion, with the other section or part, as set forth.

9. A cutting or creasing knife constructed in sections, one of said sections being provided with a bent or return portion, $e^6$, to protect the breast of the heel from the coloring-matter, and mechanism, substantially as described, for adjusting said section, provided with a bent or return portion on the section or part with which it is attached, as set forth.

In testimony whereof I have signed my name to this specification, in the presence of two subscribing witnesses, this 12th day of April, 1886.

PATRICK P. SHERRY.

Witnesses:
ARTHUR W. CROSSLEY,
A. D. HARRISON.